United States Patent
Kitajima

[11] Patent Number: 5,718,054
[45] Date of Patent: Feb. 17, 1998

[54] DEVICE FOR DISPLAYING A CENTER POINT OF A LASER BEAM IN A VERTICAL-DEGREE MEASURING SYSTEM

[76] Inventor: Tomoyuki Kitajima, 3-17-5-105, Tsurumaki, Tama-shi, Tokyo, Japan

[21] Appl. No.: 647,790

[22] Filed: May 15, 1996

[51] Int. Cl.$^6$ .................................................. G01B 11/26
[52] U.S. Cl. ......................... 33/227; 33/282; 33/286; 33/293; 33/DIG. 21
[58] Field of Search ..................... 33/227, 1 CC, 33/1 DD, 282, 283, 286, 293, 295, DIG. 21

[56] References Cited

U.S. PATENT DOCUMENTS

| | | | |
|---|---|---|---|
| 3,612,949 | 10/1971 | Becraft et al. | 33/286 |
| 3,824,666 | 7/1974 | Roodvoets et al. | 33/286 |
| 4,414,749 | 11/1983 | Johannsmeier | 33/286 |
| 4,747,454 | 5/1988 | Perryman | 33/227 |
| 5,189,484 | 2/1993 | Koschmann et al. | 33/293 |
| 5,606,802 | 3/1997 | Ogawa | 33/283 |

Primary Examiner—Christopher W. Fulton
Attorney, Agent, or Firm—Nikaido, Marmelstein, Murray & Oram LLP

[57] ABSTRACT

A device for displaying a center position of a laser beam in a vertical-degree measuring system comprises a light receiving device constituted by photosensors and a liquid crystal display panel for displaying a light receiving position. The light receiving device and the liquid crystal display panel are integrally fixed with coordinate axes registered on a vertical line. A center portion of a laser beam is subjected to data processing by an arithmetically processing section from a laser beam receiving position of the light receiving device to display a center point on the liquid crystal display panel. Since the center position displayed on the liquid crystal panel is registered with the center position of the laser beam received by the light receiving device, it is possible to directly access to the display position to utilize it as a reference point for a setting-out.

4 Claims, 2 Drawing Sheets

DEVICE FOR DISPLAYING A CENTER POINT OF A LASER BEAM IN A VERTICAL-DEGREE MEASURING SYSTEM

BACKGROUND OF THE INVENTION

1. Field of the Invention

The present invention relates to a device for displaying a center point of a laser beam in a vertical-degree measuring system making use of a laser beam for vertically installing columns, main structural reference columns and the like in the field of civil engineering, architecture and the like.

2. Description of the Prior Art

Recently, in multistoried building works or the like, many methods for measuring a vertical degree making use of a laser beam have been employed. The laser beam has a sectional area. The area becomes large in proportional to a distance. A spot of the laser beam moves from point to point due to the shaking of a building itself in the multistoried buildings. Therefore, an accurate vertical degree cannot be measured unless a center point is obtained. Methods for obtaining a center point of a laser beam in the measurement of a vertical degree of this kind employed in the past include (1) a method in which a laser beam is directly received by a translucent dial or the like to obtain the center point by an eye measurement from a locus of the laser beam; (2) a method in which a light receiving means is constituted by a light emitting diode or the like so that a laser beam detecting device is displayed by the light emitting diode to obtain the center point; and (3) a method in which a light receiving device is displayed in an X-Y two-dimensional coordinate on an external display means connected to a laser beam receiving means by means of a cable or the like.

In the above-described prior arts, the (1) method has a disadvantage in that since there is a large individual difference between measurers because of the eye measurement and since the laser beam is directly visually observed, this method is not preferred in terms of labor hygiene; and the (2) method has a disadvantage in that since there is a limit in miniaturization of the light emitting diode, an accurate position in unit of mm cannot be displayed. On the other hand, in the (3) method, since a light receiving position is electronically arithmetically processed to display the center point on the X-Y coordinate of the external display device, the center point can be accurately displayed on the coordinate as compared with the methods (1) and (2), but since the light receiving means is disposed at a position separately from the external display device, a deviation of the light received center point from a vertical position can be merely determined by this method, and the (3) method has a disadvantage in that direct access to a display position cannot be made to use that position as a reference point for a setting-out or the like, unlike the case of the (1) and (2) described above. Accordingly, any of these prior arts have a disadvantage in that the center point of the laser beam cannot be accurately specified and fixed for visual observation, the vertical degree cannot be accurately obtained, and in the marking operation of the reference point mark in the construction, it has been difficult to accurately shift a reference point of a reference story (or floor) to an upper story.

SUMMARY OF THE INVENTION

An object of the present invention is to provide, in a vertical-degree measuring system making use of a laser beam used when a column or the like is installed, a device for displaying a center point of a laser beam in which a center point of a laser beam is displayed accurately and at the position coaxial with a light receiving position, and the displayed center point of the laser beam can be utilized directly as a reference point.

For achieving the aforementioned object, a device for displaying a center point of a laser beam according to the present invention comprises a light receiving means formed from an optical sensor for sensing a laser beam and a display means for displaying a light receiving position, characterized in that said light receiving means and said display means are coaxially fixed on a vertical line, and the center point of the laser beam received by said light receiving means is displayed on said display means.

The device for displaying a center point of a laser beam according to the present invention comprises an arithmetically processing section for detecting a laser beam receiving position of said light receiving means to obtain the center point of the laser beam whereby an output from said arithmetically processing section is displayed on said display means. The arithmetically processing section is preferably provided integral with a housing in order to miniaturize the device, but may be provided separately as an exclusive-use controller. Further, preferably, the display means comprises a liquid crystal display panel.

According to the device for displaying a center point of a laser beam of the present invention, a laser beam oscillated in a vertical direction from a laser oscillator travels straight with a fixed area, and is detected by a photosensor of the light receiving means, of which position is substituted for an X-Y coordinate by the arithmetically processing section to obtain the center position thereof to display said position on the display means. Accordingly, since the center point is obtained not artificially but by the arithmetical processing, the center point can be accurately obtained. Moreover, particularly in the present invention, the light receiving means receiving the laser beam and the liquid crystal display surface can be registered in coordinate origins on one and the same vertical. The center position displayed on the display means is registered with the actual center point as it is similar to the case where the laser beam is looked straight at. Therefore, it is possible to directly access to the displayed point to utilize it as a reference point for a setting-out or the like.

DESCRIPTION OF THE PREFERRED EMBODIMENTS

Figure 1:
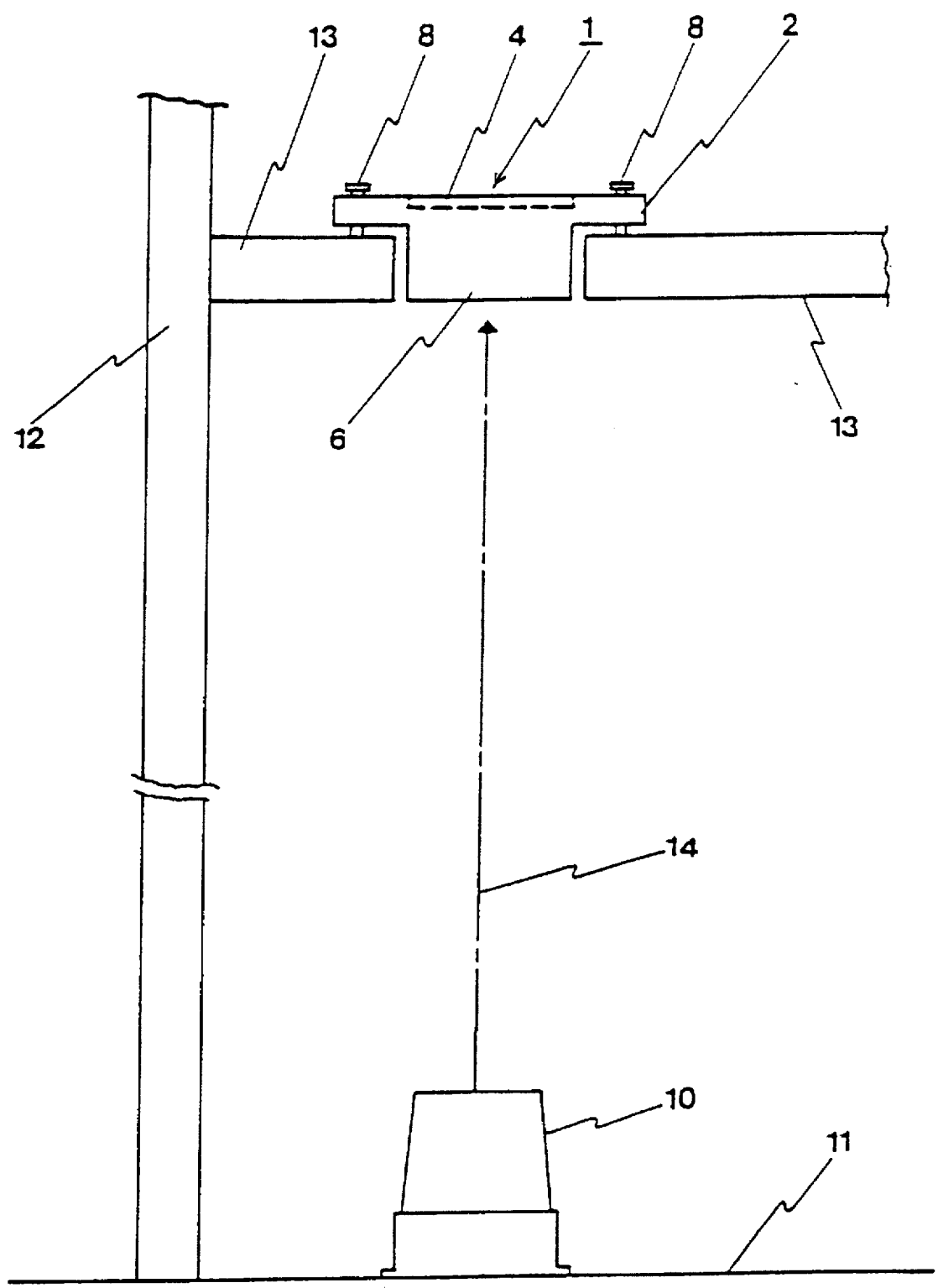
FIG. 1 is a schematic side view showing the state in which the device for displaying a center point of a laser beam according to an embodiment of the present invention is installed on an upper floor for obtaining a vertical degree.
Figure 2:
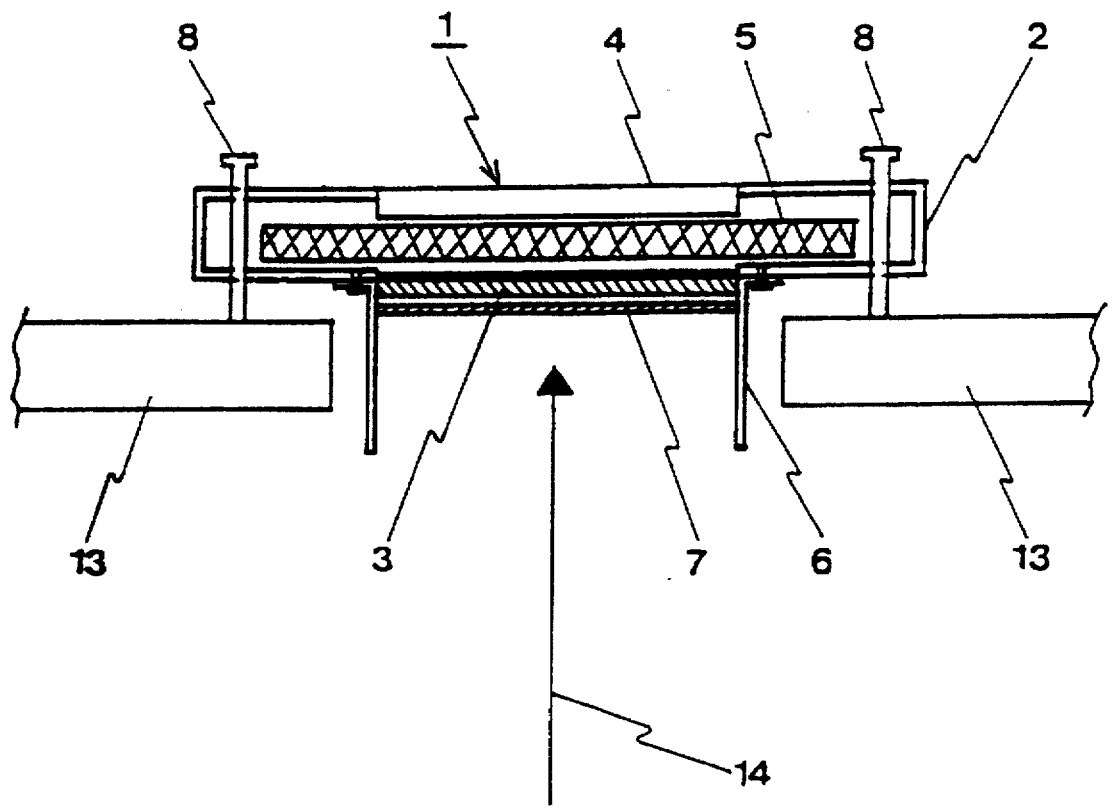
FIG. 2 is a schematic sectional view showing the internal construction.

A device for displaying a center point of a laser beam 1 according to the present embodiment is integrally provided with a casing 2 formed of a suitable material such as plastics or metal, a light receiving means 3, a liquid crystal display panel 4 as a display means, and an arithmetically processing means 5, as shown in FIG. 2. Although not shown, the light receiving means 3, the liquid crystal display panel 4 and the arithmetically processing means 5 are electrically connected so that information can be transmitted one another.

The light receiving means 3 is constituted in a matrix fashion by arranging a number of photosensors within a cylindrical or polygonal cylindrical hood 6 mounted on the lower surface of the casing 2 molded integrally with or separately from said casing 2 whereby a laser beam receiving position can be accurately detected. Reference numeral 7 designates a filter provided to cut a weak light.

The liquid crystal display panel 4 displays a center position of a laser beam detected by the light receiving means 3 on a liquid crystal image plane thereof after being obtained by an arithmetically processing means described later. The liquid crystal image plane has an X-Y coordinate surface similar to an X-Y coordinate of the photosensor matrix and is provided on the upper surface of the casing so that the coordinate origin thereof is registered with the coordinate origin of the beam receiving means 3 on a vertical line (that is, having a common Z-axis). While it is difficult to mechanically completely register the coordinate axis of the light receiving means with that of the liquid crystal display panel, the coordinate axis of the liquid crystal image plane is electronically set by a program, and therefore, the coordinate axes are adjusted by a software after the device has been assembled whereby the axes can be completely registered.

The arithmetically processing means 5 is constituted by a microprocessor so that a light receiving position is detected by a signal of a photosensor which detected a laser beam of the light receiving means 3 to process data, a center portion of a laser beam is arithmetically processed to substitute a center position of the laser beam for a two-dimensional coordinate of X-Y to output it to the liquid crystal display panel 4. While in the embodiment shown in FIG. 2, the arithmetically processing means 5 is sandwiched between the light receiving means 3 and the liquid crystal display panel 4, it is to be noted that the installing place thereof is not specified but a suitable place within the casing will suffice, or the means 5 can be separately provided as the case may be.

The housing is provided with a plurality of height adjusting screws 8 and a suitable level adjusting means such as a level so that it can be installed horizontally at a measuring position.

The device for displaying a center point of a laser beam according to the present embodiment is constituted as described above. A description will be made of the case where the aforementioned device is used to shift a reference point of a reference floor in the setting-out in building to an upper floor.

A laser oscillator 10 is accurately installed at a reference point of a reference floor 11 so as to oscillate a laser beam in a vertical direction, and the device for displaying a center point of a laser beam 1 is installed on an upper floor 13 secured to a column or a wall 12 so that the light receiving means 3 is opposed to the laser oscillator 10.

A laser beam 14 projected in a vertical direction from the laser oscillator 10 installed on the reference floor travels straight with a fixed area, and passes through a filter 7 of the device for displaying center point of a laser beam, an area and a position thereof being detected by the light receiving means 3.

In order to minimize an error caused by the shaking of the laser beam 14 and vibrations of the laser oscillator 10 and the device for displaying a center point of a laser beam itself, the light receiving means 3 measures the laser beam 14 plural times, and an average value of the center point is substituted for a two-dimensional coordinate from the measured positions and magnitude to find a final value, which is displayed on the liquid crystal display panel 4 integrally secured to the light receiving means.

Since the light receiving means receiving the laser beam and the liquid crystal image plane are registered in the coordinate origins on one and the same vertical, it is possible to directly access to the displayed center position, which position can be used as a reference point to directly perform a setting-out or the like. And it is possible to obtain a reference point accurately, in a short period of time an easily without requiring any skill.

Further, since the observation of the image plane and the marking operation of the reference points can be done by one and the same person, labor saving can be attained as compared with prior art. Moreover, since the laser beam need not be directly visualized, it is safety in terms of labor hygiene. Since the display means is constituted by the liquid crystal panel, the entire device can be constituted to be small and light-weight.

The present invention is not limited to the above-described embodiment, but various changes in design within the scope of the technical idea thereof can be made. For example, as the device for displaying a center point of a laser beam, there can be employed, in addition to the device in which the light receiving means and the display means are integrally constituted as in the above-described embodiment, a device in which it merely comprises a light receiving means, and a display means is constituted separately from an arithmetically processing means; and a device in which a light receiving means, an arithmetically processing means and a display means are integrally constituted. The display means is not limited to the liquid crystal display panel but CRT or the like can be employed. However, a liquid crystal display panel is preferred for miniaturization and reduction in weight.

What is claimed is:

1. A device for displaying a center point of a laser beam comprising:

a light receiver formed from an optical sensor for sensing a laser beam, a liquid crystal display panel for displaying a light receiving position, wherein said light receiver and said display panel are coaxially fixed on a vertical line, and the center point of the laser beam received by said light receiver is displayed on said display panel, and an arithmetic processing section for detecting the laser beam receiving position of the laser beam on said light receiver, arithmetically processing a center portion of the laser beam, and outputting the center point of the laser beam to the display panel.

2. The device for displaying a center point of a laser beam according to claim 1, further comprising a housing, said arithmetic processing section being provided integrally in said housing together with said light receiver and said display panel.

3. The device for displaying a center point of a laser beam according to claim 1 or 2, wherein said light receiver constitutes an X-Y coordinate surface and comprises a plurality of photosensors arranged in a plane in a matrix fashion.

4. The device for displaying a center point of a laser beam according to claim 3, wherein said display panel constitutes an X-Y coordinate surface having a coordinate origin registered with a coordinate origin of said light receiver on a vertical line.

* * * * *